United States Patent
Rhodes et al.

(10) Patent No.: US 9,201,687 B2
(45) Date of Patent: Dec. 1, 2015

(54) USER INTERFACE FOR PROCESS RELATIONSHIP MANAGEMENT

(75) Inventors: Christina L. Rhodes, Kirkland, WA (US); Matthew P. Duignan, Seattle, WA (US); Peter Seraphim Ponomarev, Seattle, WA (US); Mark Yalovsky, Seattle, WA (US); Rolf A. Ebeling, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 13/225,255

(22) Filed: Sep. 2, 2011

(65) Prior Publication Data

US 2013/0061162 A1   Mar. 7, 2013

(51) Int. Cl.
G06F 3/00 (2006.01)
G06F 9/48 (2006.01)

(52) U.S. Cl.
CPC ..................................... G06F 9/485 (2013.01)

(58) Field of Classification Search
None
See application file for complete search history.

(56) References Cited

U.S. PATENT DOCUMENTS

| | | | | |
|---|---|---|---|---|
| 7,124,403 | B2 | 10/2006 | Price et al. | |
| 2003/0236811 | A1* | 12/2003 | Green et al. | 709/100 |
| 2004/0040024 | A1* | 2/2004 | Green et al. | 718/100 |
| 2004/0041840 | A1* | 3/2004 | Green et al. | 345/776 |
| 2005/0060663 | A1 | 3/2005 | Arkeketa et al. | |
| 2008/0109753 | A1* | 5/2008 | Karstens | 715/802 |

OTHER PUBLICATIONS

Henry Bennet, "Making the Most of Activity Monitor", AppStorm (Aug. 4, 2009), available at http://mac.appstorm.net/how-to/os-x/making-the-most-of-activity-monitor/.*

"Troubleshooting with Activity Monitor", The X Lab (2010), available at http://www.thexlab.com/faqs/activitymonitor.html.*

"Make Activity Monitor Easier to Read with Hierarchical Process Sorting", OS X Daily (Aug. 30, 2011), available at http://osxdaily.com/2011/08/30/make-activity-monitor-easier-to-read-with-hierarchical-process-sorting/.*

"I can't kill a chrome process that has become unresponsive", .Retrieved at <<http://google.divxadresi.com/support/forum/p/Chrome/thread?tid=3bd41a34547abb30&hl=en&fid=3bd41a34547abb30000477ef718a7db3&hltp=2>>, Retrieved Date: Jun. 15, 2011, pp. 52.

"Windows 8: Modern Task Manager, Ribbon UI, Auto Aero, History Vault [New Features]", Retrieved at <<http://www.techexplorer.in/2011/04/windows-8-task-manager-ribbon-history-vault/>>, Retrieved Date: Jun. 15, 2011, pp. 11.

Campbell, Mark, "Closing Programs Not Responding Without Task Manager", Retrieved at <<http://computersight.com/software/closing-programs-not-responding-without-task-manager/>>, Mar. 30, 2011, pp. 2.

Vidyadhar, "System Task Manager for linux", Retrieved at <<http://www.techienote.com/2010/09/task-manager-for-linux.html>>, Sep. 16, 2010, pp. 24.

"Task Manager and ps", Retrieved at <<http://www.macdesign.net/academic/it4813/it4813-Submitted/IT4813-u02d2-Task_Manager_and_ps.html>>, Retrieved Date: Jun. 16, 2011, pp. 4.

"End Process / End Task on Hung / Not Responding Programs Does Nothing", Retrieved from: <http://social.technet.microsoft.com/Forums/en/w7itproperf/thread/598fe2b4-844d-412d-b195-5fa53dc62661> on Apr. 26, 2013,(Jan. 19, 2009), 50 pages.

* cited by examiner

*Primary Examiner* — Scott Baderman
*Assistant Examiner* — Asher Kells
(74) *Attorney, Agent, or Firm* — Sunah Lee; Kate Drakos; Micky Minhas

(57) ABSTRACT

Various embodiments for process relationship management are described. In at least some embodiments, a user interface is presented that provides an integrated view of processes that are running on a computing device and relationships between the processes. For example, the user interface can display a visual indication that a first process is related to a second process and that if a user closes the first process, the second process will also close as a result. Further to one or more embodiments, the user interface can display status messages regarding processes, such as that a process is not responding to a request to close or that a process is waiting on user input.

20 Claims, 9 Drawing Sheets

USER INTERFACE FOR PROCESS RELATIONSHIP MANAGEMENT

BACKGROUND

Process management on a computing device can present a number of challenges. For example, when a user closes an application, the user may not be aware that other processes that are related to the application may close or be interrupted when the application is closed. Thus, a user may inadvertently cause a particular process to be terminated by closing an application or other process that is related to the particular process. This can cause an undesirable interruption in process performance and, in some cases, may cause a user to lose unsaved work associated with an inadvertently closed process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments for process relationship management are described. In at least some embodiments, a user interface is presented that provides an integrated view of processes that are running on a computing device and relationships between the processes. Examples of processes include applications, utilities, services, windows, tabs, and so on. In implementations, the user interface can display a visual indication that a first process is related to a second process and that if a user closes the first process, the second process will also close as a result. Further to one or more embodiments, the user interface can display status messages regarding processes, such as that a process is not responding to a request to close or that a process is waiting on user input.

BRIEF DESCRIPTION OF THE DRAWINGS

The detailed description is described with reference to the accompanying figures.

DETAILED DESCRIPTION

Overview

Figure 1:
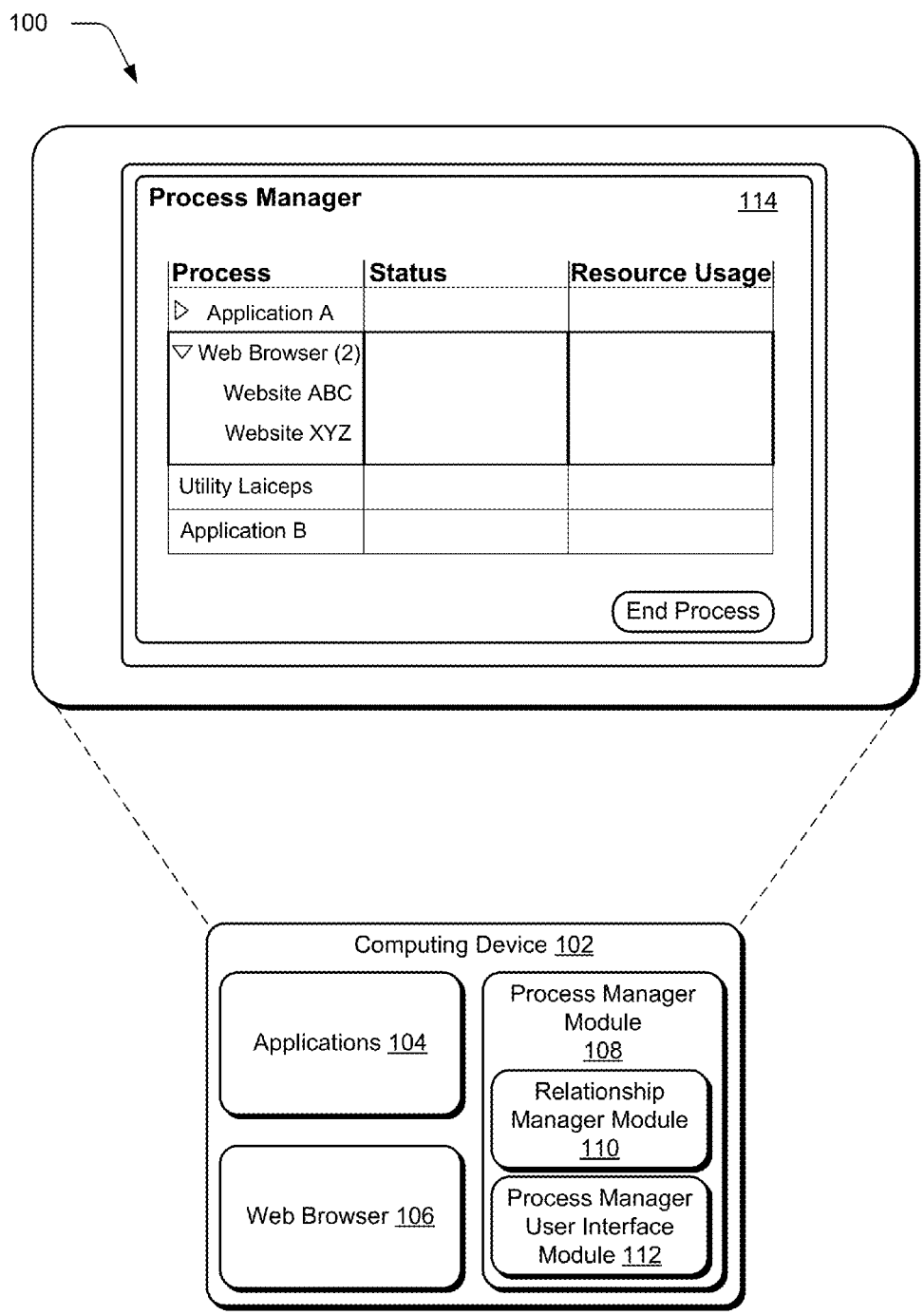
FIG. 1 is an illustration of an environment in an example implementation in accordance with one or more embodiments.

Various embodiments for process relationship management are described. In at least some embodiments, a user interface is presented that provides an integrated view of processes that are running on a computing device and relationships between the processes. Examples of processes include applications, utilities, services, windows, tabs, and so on. In implementations, the user interface can display a visual indication that a first process is related to a second process and that if a user closes the first process, the second process will also close as a result. Further to one or more embodiments, the user interface can display status messages regarding processes, such as that a process is not responding to a request to close or that a process is waiting on user input.

For instance, consider an example scenario where a word processor application is running and several document windows are open to display different documents that are being edited using the word processor application. In at least some embodiments, a process manager user interface is presented that displays an indication of the word processor application as well as the document windows that are open. Further to implementations, a user selects a particular one of the document windows to be closed and a request to close the document window is sent to the document window and/or to the word processor application.

In at least some embodiments, if a response to the request is not received (e.g., the document window does not close) within a particular period of time, the process manager user interface displays a message indicating that that the document window is not responding to the request to close. For example, an error may occur with the word processor application that may cause the application to hang and/or stop responding to messages. In addition, the process manager user interface displays a visual indication that the document windows are related to the word processor application and that if the word processor application is closed, the document windows will also close. A user may then be given the option to close the word processor application along with the related document windows.

Alternatively, a response to the request to close the document window may be received indicating that the document window or the word processor application is waiting for input from the user. For example, the application may send a response to the request indicating that there is unsaved work associated with the document window and requesting whether to save the unsaved work before closing the document window. In implementations, the process manager user interface can display a visual indication that the document windows are related to the word processor application and that the document window or the word processor application is waiting on input from the user. The user may then take further actions, such as saving the unsaved work or closing the document window without saving the unsaved work.

In the following discussion, an example environment is first described that is operable to employ the techniques described herein. Next, a section entitled "Process Management Scenarios" describes example process management scenarios in accordance with one or more embodiments. Following this, a section entitled "Example Methods" describes example methods in accordance with one or more embodiments. Last, a section entitled "Example Device" describes aspects of an example device that can be utilized to implement one or more embodiments.

Having considered an overview of the embodiments about to be described, consider now a discussion of an example environment in which various embodiments can operate.

Example Environment

FIG. 1 is an illustration of an environment 100 in an example implementation that is operable to employ techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2.

Thus, the computing device 102 may range from full resource devices with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes applications 104 which are operational to provide various functionalities via the computing device 102. Examples of the applications 104 include a word processor application, an email application, a content editing application, and so on. Further included as part of the computing device 102 is a web browser 106 that is operational to provide web browsing functionality as described in this document. The applications 104 and/or the web browser 106 can be implemented in connection with any suitable type of hardware, software, firmware or combination thereof.

The computing device 102 further includes a process manager module 108 that is representative of functionality to manage various processes for the computing device and to enable a user to perform actions that affect the various processes. Examples of processes include applications (e.g., the applications 104 and/or the web browser 106), utilities (e.g., system utilities), service hosts, services (e.g., operating system services), visual windows, tabs (e.g., browser tabs), and so on. Included as part of the process manager module 108 is a relationship manager module 110. In at least some embodiments, the relationship manager module 110 is configured to track relationships between different processes of the computing device 102, such as a parent-child relationship between a parent process and its child sub-processes. For example, the relationship manager module 110 can track a dependency relationship between the web browser 106 (e.g., a parent process) and active windows and/or tabs that correspond to different web sites that are navigated to via the web browser, e.g., child processes.

The process manager module further includes a process manager user interface module 112 that is representative of functionality to output information regarding process relationships and to receive input regarding the relationships. As part of such input/output functionalities, a user interface 114 is illustrated that can be generated and managed by the process manager user interface module 112. As discussed in more detail below, the user interface 114 includes indications of relationships between various processes of the computing device 102 and can enable a user to provide input to affect the various processes and/or relationships.

Figure 2:
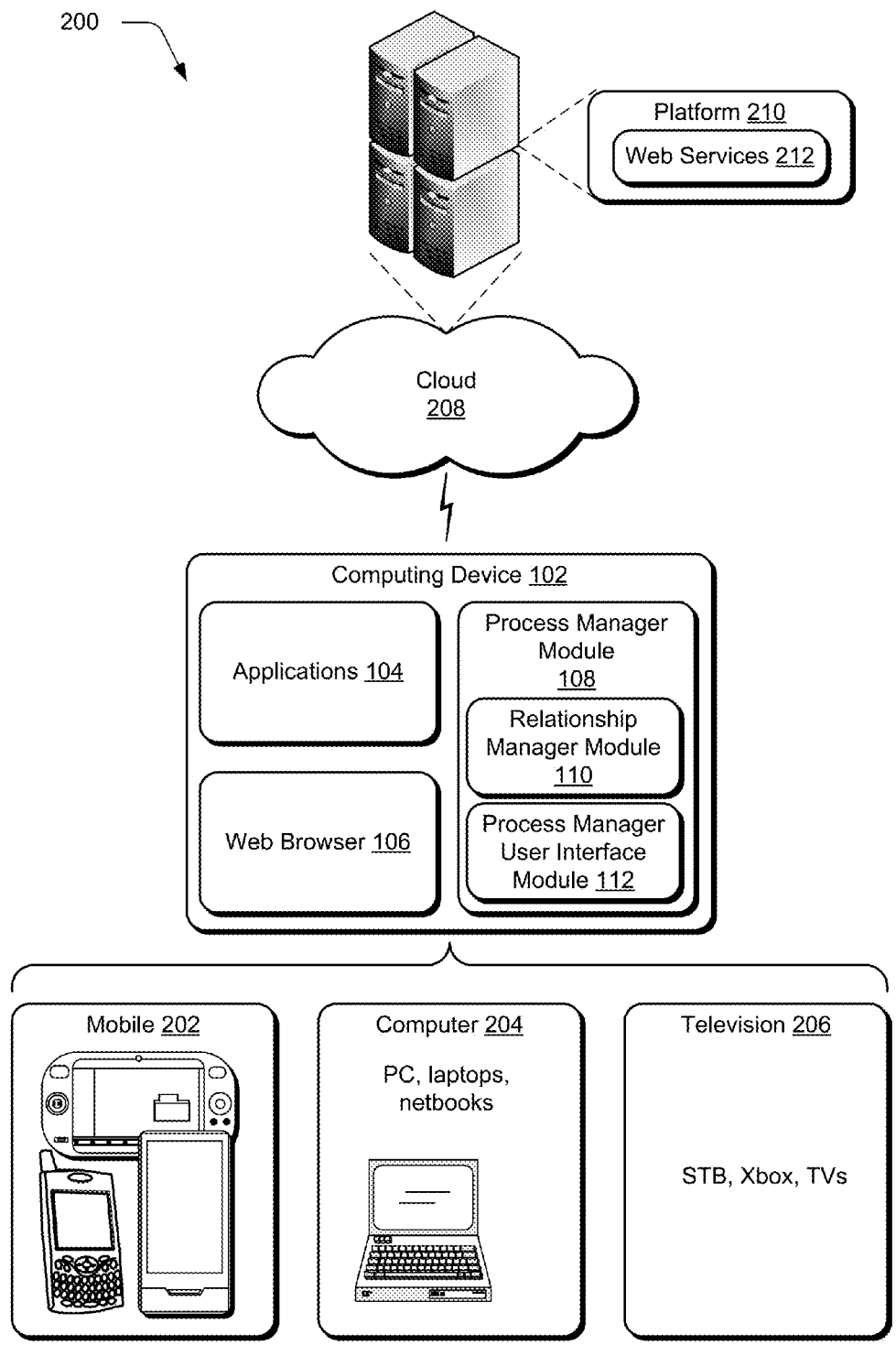
FIG. 2 is an illustration of a system in an example implementation showing FIG. 1 in greater detail.

FIG. 2 illustrates an example system 200 showing the process manager module 108 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size or form factor and thus the computing device 102 may be configured as one of these device classes in this example system 200. For instance, the computing device 102 may assume the mobile 202 class of device which includes mobile telephones, music players, game devices, slate-type or tablet-type form factor devices and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. In implementations, the web services 212 may provide and/or contribute to various aspects of the process management techniques discussed herein, such as functionalities discussed with respect to the process manager module 108 and/or other functionalities of the computing device 102. A variety of other functionalities and services are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the process management techniques described herein are platform-independent, meaning that the techniques may be implemented on a variety of commercial computing platforms having a variety of processors.

Having discussed an example environment and system, consider now a discussion of example user interfaces in accordance with one or more embodiments.

Process Management Scenarios

This section discusses example process management scenarios that utilize techniques discussed herein in accordance with one or more embodiments. In at least some implementations, the process management scenarios include user interfaces that can be generated and managed by the process manager user interface module 112, discussed above with reference to FIGS. 1 and 2. Additionally, aspects and implementations of the example process management scenarios are discussed with reference to features of the environment 100 and/or the system 200.

Figure 3:
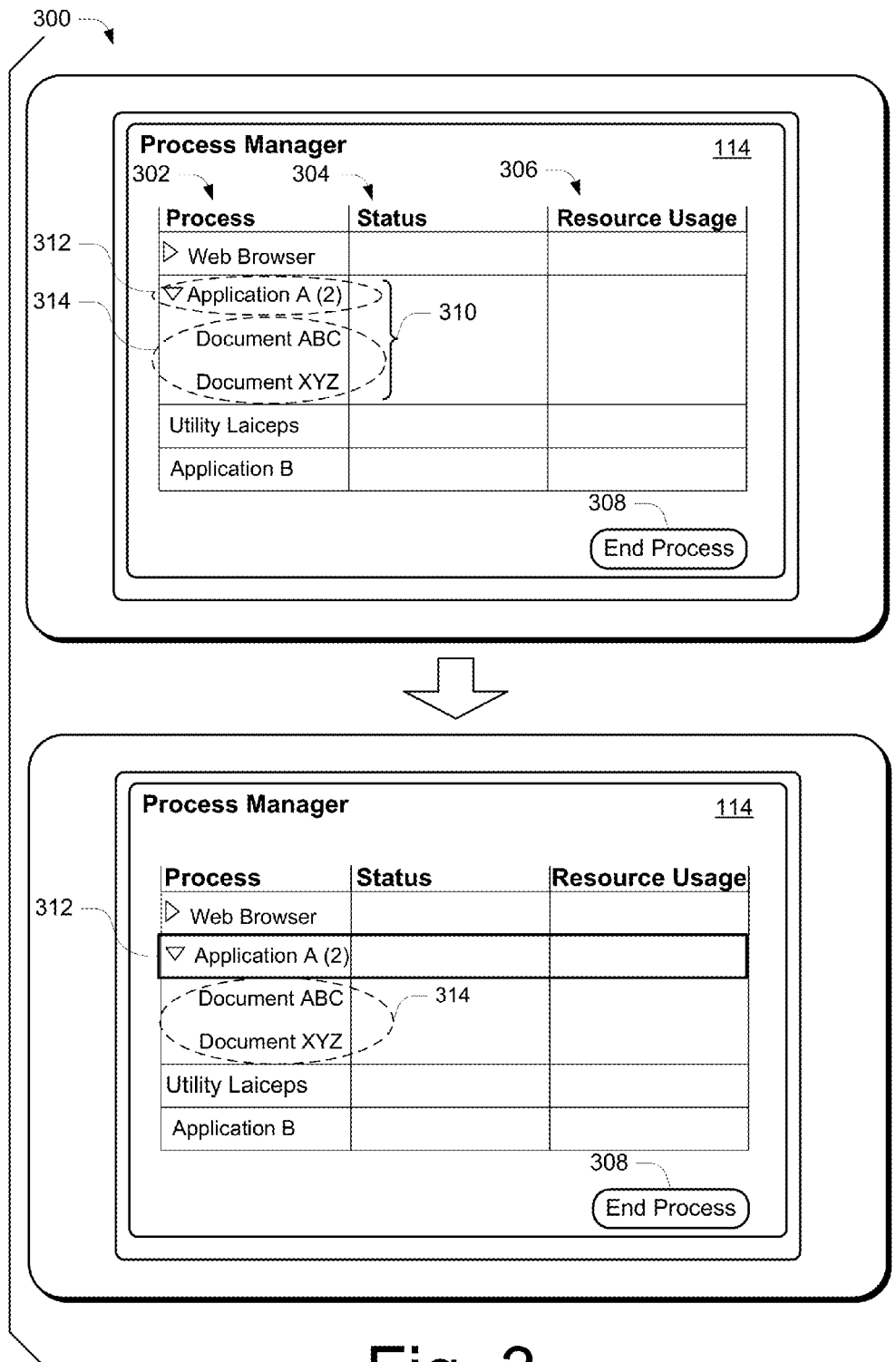
FIG. 3 is an illustration of an example process management scenario in accordance with one or more embodiments.

FIG. 3 illustrates an example process management scenario 300 in accordance with one or more embodiments. Included as part of the process management scenario 300 is the user interface 114, discussed above with reference to environment 100. The user interface 114 includes a process region 302, a status region 304, and a resource usage region 306. In embodiments, the process region 302 displays indications of processes that are active on a computing device. The status region 304 displays indications of a status for one or more processes from the process region 302. For example, the status region 304 can include status messages for a process, as is discussed in more detail below.

The resource usage region 306 includes information regarding resource usage for a process. Examples of resources include memory resources, processor resources, network resources, and so on. In embodiments, the resource usage region 306 can indicate a percentage of a total available amount of a particular resource is being utilized by a process listed in the process region 302.

Further included as part of the user interface 114 is an end process control 308. As is discussed in more detail below, the end process control 308 can be selected to close a process and/or group of processes that are identified in the process region 302.

The user interface 114 further includes a visual group 310 that identifies a group of processes that are related. In embodiments, identifying processes as part of a visual group indicates that a dependency relationship exists between processes of the group and that closing a particular process in the group may affect another process of the group. Additionally, the visual placement of a process within a visual group indicates the position of the process within a hierarchy of processes for the visual group. For example, the visual group 310 includes a parent process 312 and child processes 314. The visual placement of the parent process 312 with respect to the child processes 314 (e.g., above and to the left) indicates the parent/child relationship between the processes, e.g., that the parent process 312 is a parent to the child processes 314.

As part of the example process management scenario 300, a user selects the process 312 and selects the end process control 308 to close the parent process 312. In embodiments, selecting the parent process 312 to be closed causes the visual group 310 to be closed, e.g., the parent process 312 and the child processes 314. Additionally or alternatively, the parent process 312 may fail to respond to a request to close, e.g., because the parent process is hung and/or is in a locking state. In embodiments where the parent process 312 fails to respond, the parent process and the child processes 314 may automatically be force closed, e.g., by the process manager module 108.

While examples presented herein are discussed with reference to an application/application window relationship, this is not intended to be limiting and a wide variety of hierarchical process relationships may be managed using techniques discussed herein. As a further example of such a relationship is a service host/service relationship. In implementations, a service host can initiate and manage a number of different services for a computing device. Thus, techniques discussed herein may be implemented to manage relationships between a service host and its services.

Figure 4:
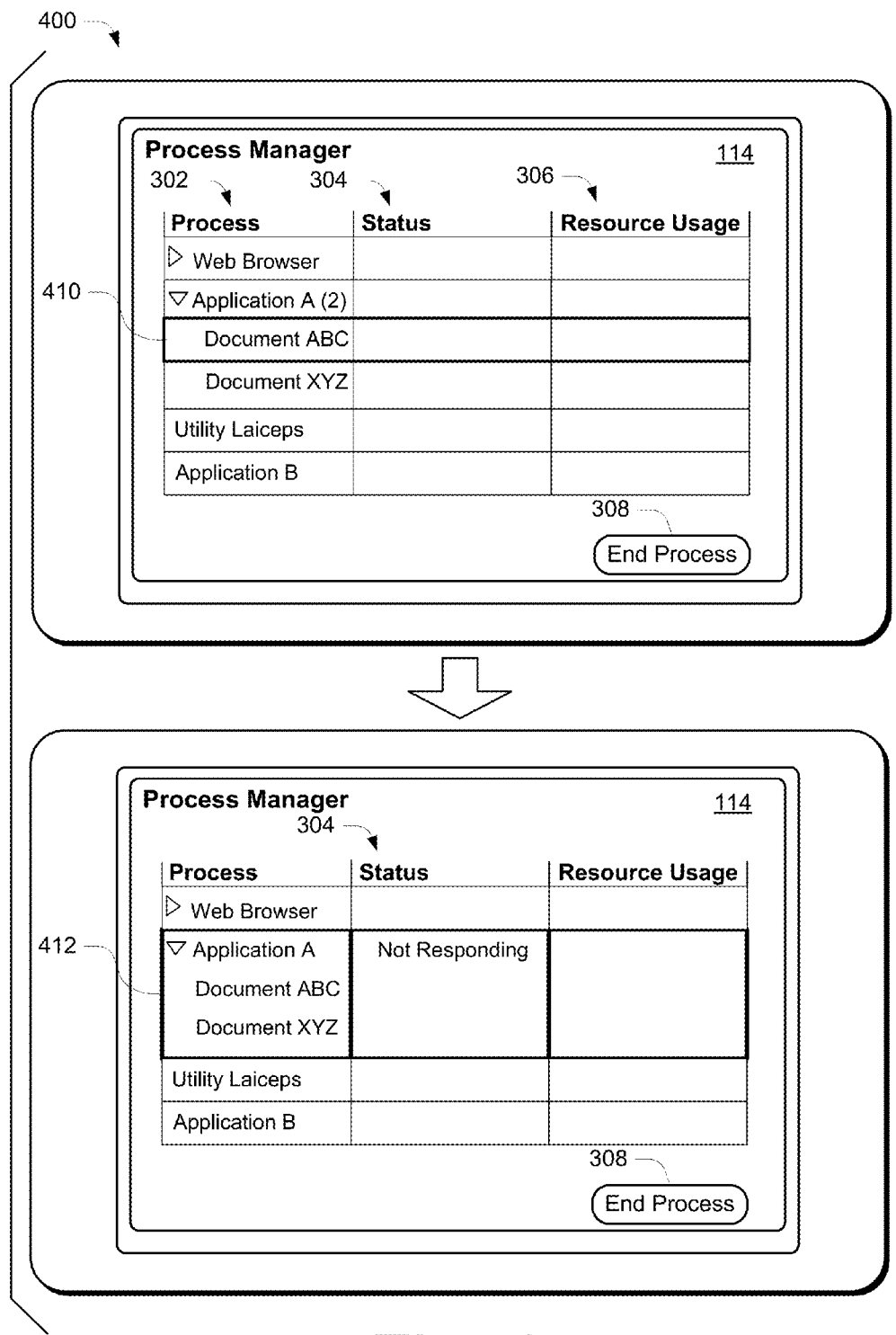
FIG. 4 is an illustration of an example process management scenario in accordance with one or more embodiments.

FIG. 4 illustrates an example process management scenario 400 in accordance with one or more embodiments. As part of the process management scenario 400, a user selects a process 410 and selects the end process control 308 to request that the process 410 be closed. In implementations, a message is sent to the process 410 (e.g., via the process manager module 108) requesting that the process close. Further to the example scenario, the process 410 does not reply to the request to close within a specified period of time. In embodiments, a process can respond to a request to close by closing and/or by replying with a status message for the process. Further to one or more embodiments, a process may not respond to a request to close within a specified period of time because the process is locked on a task, is hung, and/or is experiencing some other type of error. In at least some implementations, the process manager module 108 can be configured to perform one or more actions if a process does not respond to a request to close within a pre-specified period of time.

Continuing with the example process management scenario 400, the user interface 114 displays an indication in the status region 304 that the process 410 is not responding to the request to close. Additionally, the user interface 114 visually emphasizes a group 412 of processes that are related to the process 410. In embodiments, a group of processes can be visually emphasized using a variety of techniques, such as highlighting the processes with a similar color, enlarging a font size for the related process, and so on. Further to at least some implementations, the visual emphasis on group 412 indicates that the processes in the group are related and that the processes will close as a group, e.g., closing one of the processes will cause all of the processes in the group to close.

Further to the example process management scenario 400, a user may select the end process control 308 to cause the processes in the group 412 to close in response to a single selection of the end process control.

Figure 5:
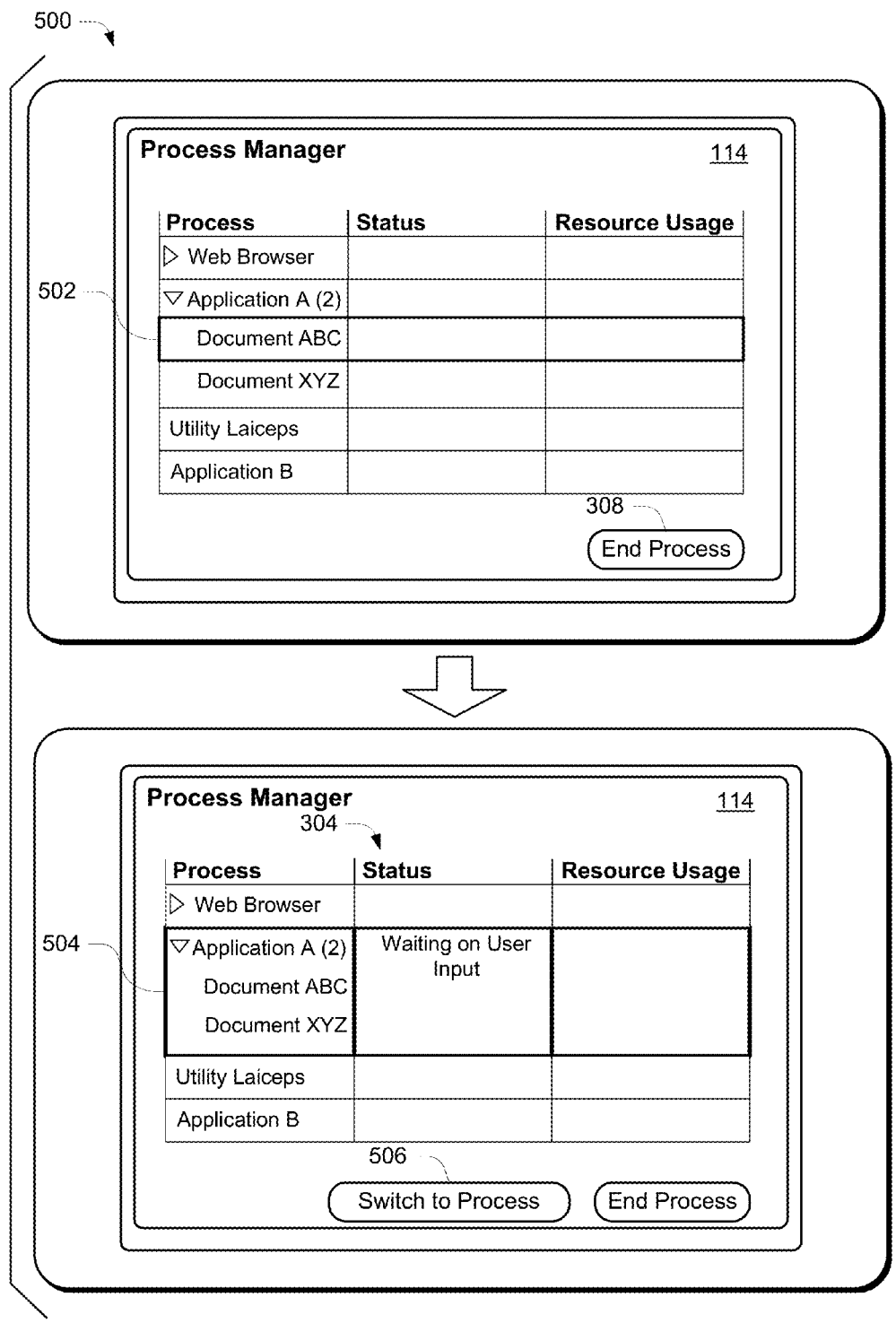
FIG. 5 is an illustration of an example process management scenario in accordance with one or more embodiments.

FIG. 5 illustrates an example process management scenario 500 in accordance with one or more embodiments. As part of the process management scenario 500, a user selects a process 502 and selects the end process control 308 to request that the process close. In implementations, a request is sent to the process 502 requesting that the process close. In this particular example scenario, the process 502 corresponds to a document that is being edited via an application, e.g., one of the applications 104. A reply to the request to close is received indicating that the process 502 is waiting for input from the user. For example, edits to the document may not be saved to persistent memory such that if the document is closed, the edits will be lost. Thus, the process 502 may be waiting for input from the user indicating whether to save the edits to the document before the process is closed.

Further to the process management scenario 500, the user interface 114 visually emphasizes a group 504 of processes that are related to the process 502. Additionally, the user interface 114 displays in the status region 304 a status for the group 504 indicating that the process 502 or the group 504 is waiting on input from the user. In embodiments, the user can switch focus to the process 502 or another process of the group 504 to provide the requested input. For example, the user can navigate to the process 502 to save unsaved work. As illustrated, in embodiments the user interface 114 includes a switch to process control 506 that, if selected, navigates the user's focus to the process that is requesting input from the user, e.g., a user interface associated with the process 502. Further to implementations, providing the requested user input can cause the process 502 to be closed while other processes included as part of the group 504 may remain active, e.g., open.

In embodiments, instead of providing the requested user input, the user can select the end process control 308, which causes the process 502 and/or all processes in the group 504 to be closed. In embodiments where there is unsaved work for the process 502, this can cause the process to close without saving the unsaved work.

Example Methods

The following discussion describes methods that can be implemented in accordance with one or more embodiments. Aspects of the methods can be implemented in hardware, firmware, software, or a combination thereof. The methods are shown as a set of blocks that specify operations performed by one or more devices and are not necessarily limited to the orders shown for performing the operations by the respective blocks. In portions of the following discussion, reference will be made to features and aspects of embodiments discussed elsewhere herein. For example, aspects of the methods can be implemented via interaction between the process manager module 108 and the user interface 114.

Figure 6:
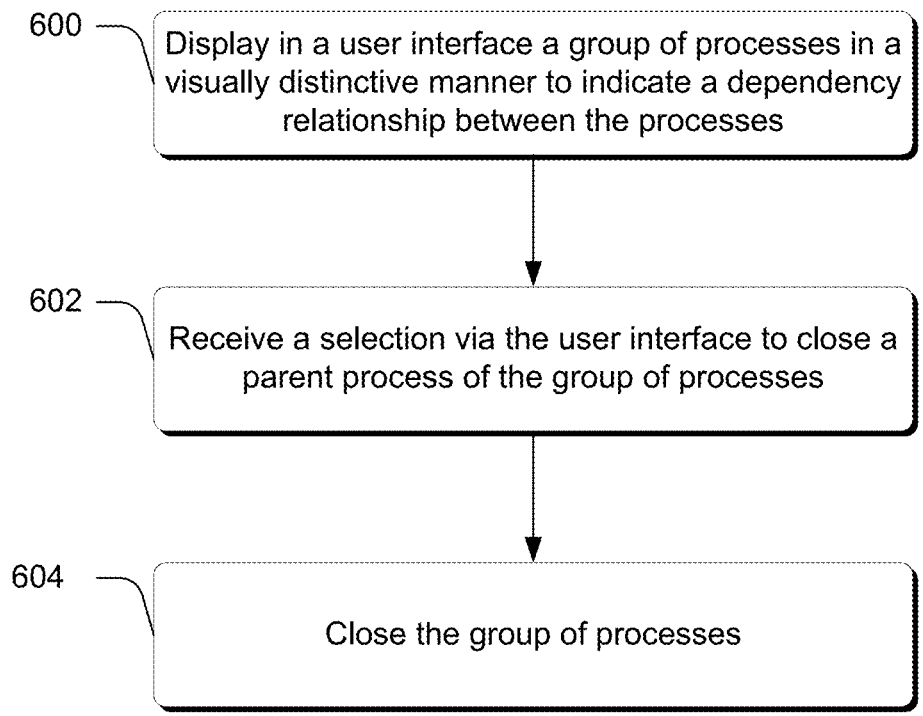
FIG. 6 is a flow diagram that describes steps in a method in accordance with one or more embodiments.

FIG. 6 is a flow diagram that describes steps in a method in accordance with one or more embodiments. Step 600 displays in a user interface a group of processes in a visually distinctive manner to indicate a dependency relationship between the processes. For example, the visually distinctive manner can indicate that the processes are related and can visually convey a hierarchical relationship between the processes such that if one of the processes is closed, others of the processes will close as a result.

Step 602 receives a selection via the user interface to close a parent process of the group of processes. For example, a user can select a parent process from the user interface 114 and select the end process control 308 to request that the process close. Step 604 closes the group of processes. For example, the parent process and child processes of the parent process can be closed. In embodiments, the parent process may not respond to the request to close, e.g., where the parent process is hung or is in a locking state. In such embodiments, the parent process may be automatically forced closed along with the other processes of the group.

Figure 7:
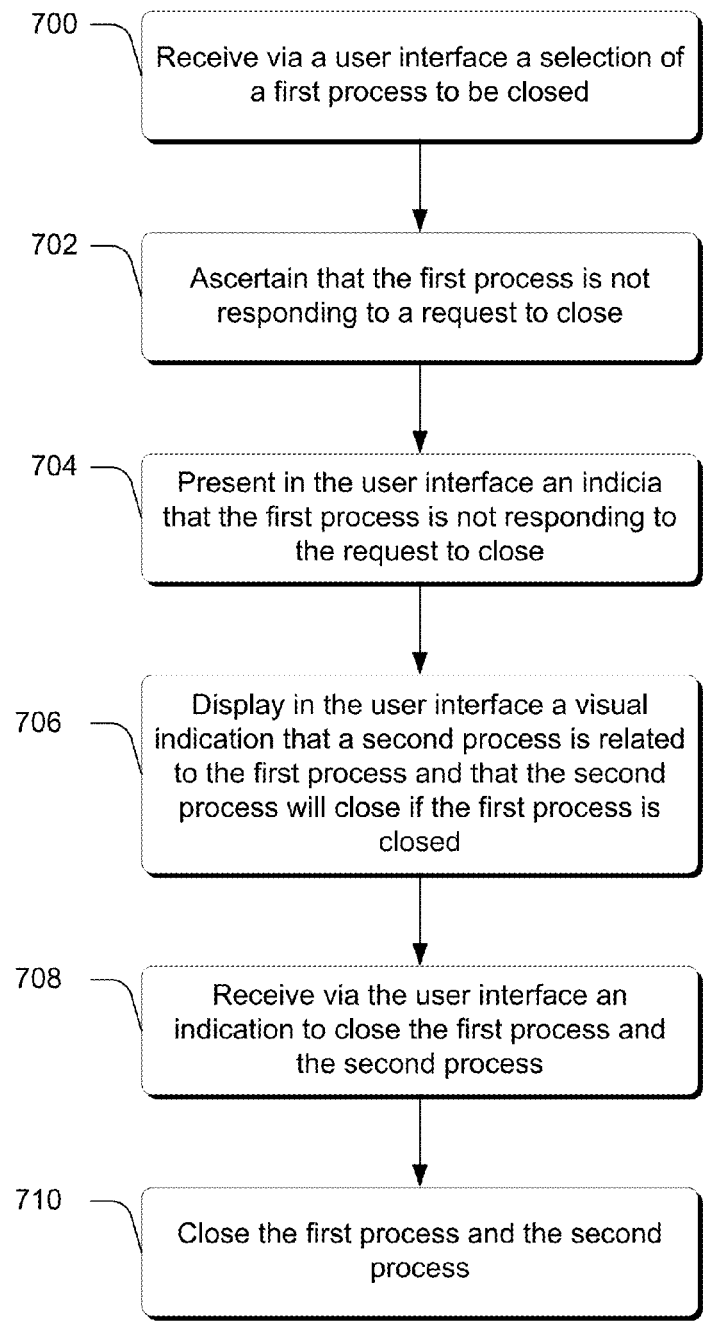
FIG. 7 is a flow diagram that describes steps in a method in accordance with one or more embodiments.

FIG. 7 is a flow diagram that describes steps in a method in accordance with one or more embodiments. Step 700 receives via a user interface a selection of a first process to be closed. For example, a user can select one of the applications 104 via the user interface 114 and can select the end process control 308. In response to these selections, the process manager module 108 can send a request to the application to close. Step 702 ascertains that the first process is not responding to a request to close. In embodiments, the process manager module 108 can determine that a pre-determined period of time has elapsed (e.g., a process time-out interval) since the request to close was sent to the first process. As a result, the process manager module 108 can ascertain that the first process is not responding to the request to close.

Step 704 presents in the user interface an indicia that the first process is not responding to the request to close. For example, a message can be displayed adjacent to an indication of the first process indicating that the first process is not responding to the close request.

Step 706 displays in the user interface a visual indication that a second process is related to the first process and that the second process will close if the first process is closed. In implementations, the process manager module 108 can determine that the second process is a parent or child process that is related to the first process. Further to implementations, the first process and the second process can be automatically visually linked together to indicate that the processes cannot be closed individually but can be closed as a group.

Step 708 receives via the user interface an indication to close the first process and the second process. For example, a user can select the end process control 308 to cause the linked processes to be closed. Step 710 closes the first process and the second process. In embodiments where one or more of the linked processes are not responding to a request to close, the process manager module 108 can perform a "force close" operation that causes the linked processes to close.

While embodiments are discussed herein with respect to closing a process that is in a locking state, techniques may also be employed to close processes (e.g., a parent process and/or child processes) that are not necessarily in a locking state. Thus, the discussed techniques can be implemented to view relationships between processes and enable a user to close specific processes.

Figure 8:
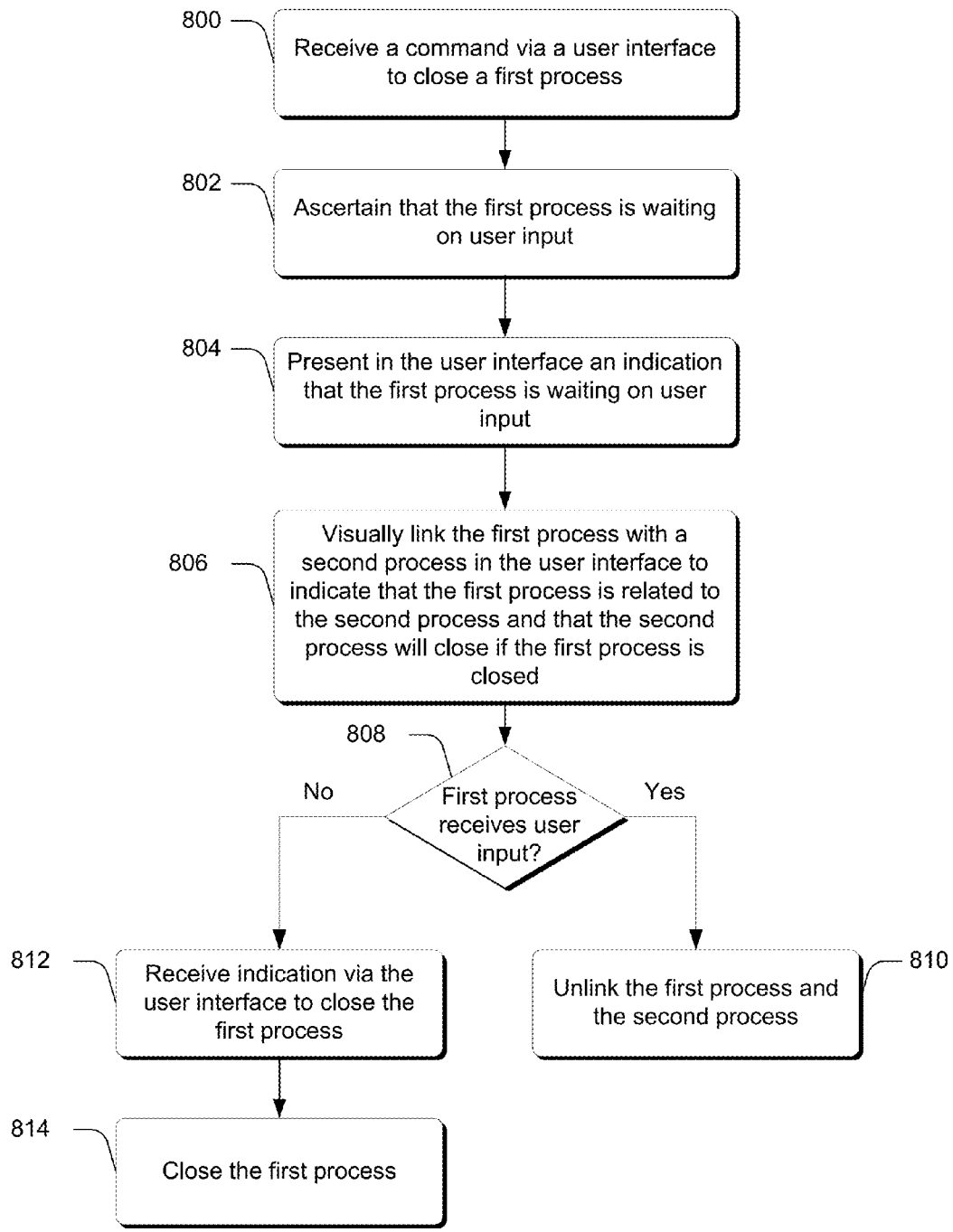
FIG. 8 is a flow diagram that describes steps in a method in accordance with one or more embodiments.

FIG. 8 is a flow diagram that describes steps in a method in accordance with one or more embodiments. Step 800 receives a command via a user interface to close a first process. Step 802 ascertains that the first process is waiting on user input. In embodiments, the process manager module 108 can send a close request to the first process. The first process can respond to the close request with an indication that the process is waiting on user input. For example, the first process can be waiting on a user decision whether to save unsaved edits to a document, whether to send an unsent email, whether to save progress in a game, and so on.

Step 804 presents in the user interface an indication that the first process is waiting on user input. For example, a message can be displayed in the user interface adjacent to the first process indicating that the first process is waiting on input from the user. Step 806 visually links the first process with a second process in the user interface to indicate that the first process is related to the second process and that the second process will close if the first process is closed. In implementations, the first process and the second process can be visually emphasized in the user interface (e.g., user interface 114) to indicate that the processes are related. Further to at least some embodiments, lining the first process with the second process can indicate that the processes will close as a group in response to a further close request.

Step 808 determines whether the first process receives user input. If the first process receives user input ("Yes"), step 810 unlinks the first process and the second process. For example, the user can switch focus from the user interface to the application and provide the user input. In implementations, unlinking the processes can enable the processes to be closed individually.

If the first process does not receive the user input ("No"), step 812 receives an indication via the user interface to close the first process. Step 814 closes the first process. In implementations, closing the first process without providing the user input can cause unsaved work and/or progress associated with the first process to be lost. Further to at least some embodiments, closing the first process can cause processes that are grouped with the first process (e.g., the second process) to also be closed.

Having described various example embodiments, consider now a discussion of an example device that can be utilized to implement one or more embodiments.

Example Device

Figure 9:
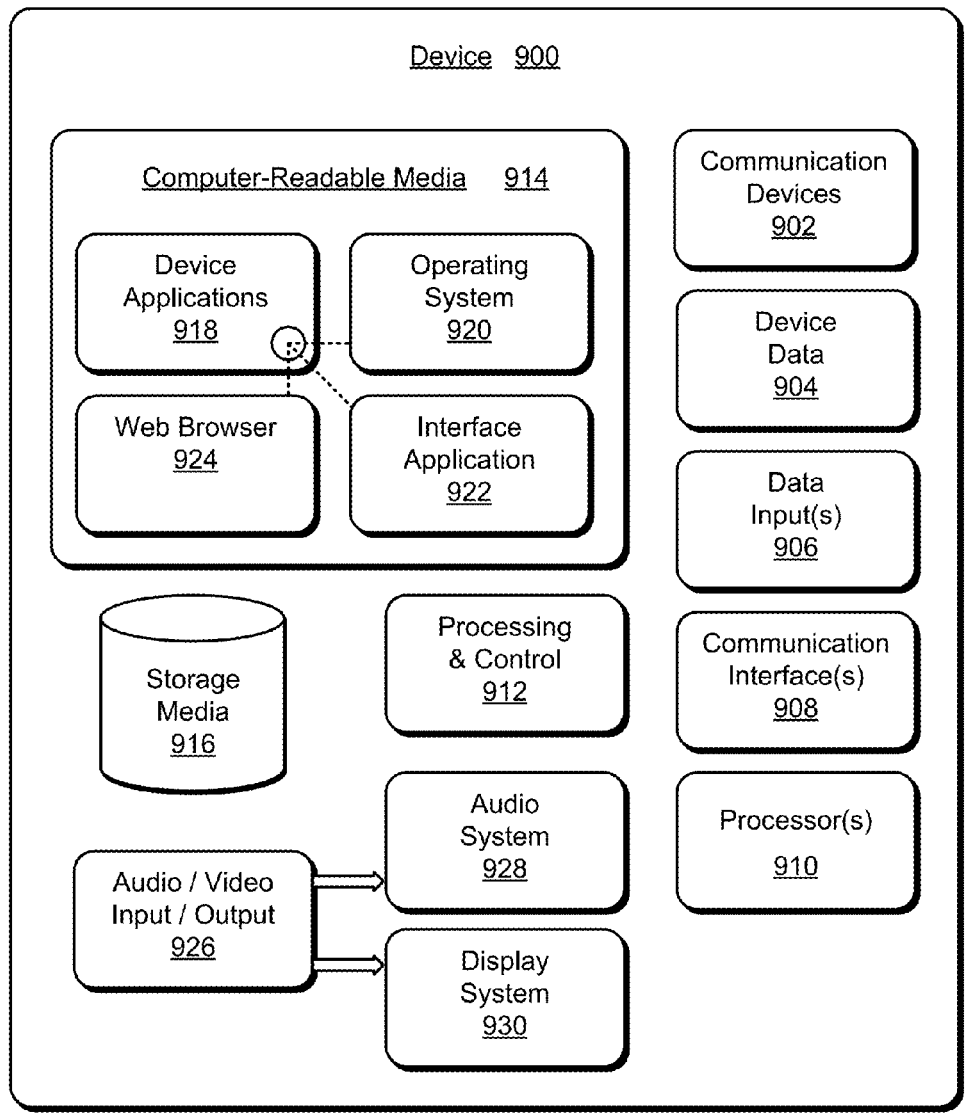
FIG. 9 illustrates an example computing device that can be utilized to implement various embodiments described herein.

FIG. 9 illustrates various components of an example device 900 that can be implemented as any type of portable and/or computer device as described with reference to FIGS. 1 and 2 to implement the embodiments described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable or readable instructions to control the operation of device 900 and to implement the process management embodiments described above. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the process management techniques described herein. In this example, the device applications 918 include an interface application 922 and a web browser 924 that are shown as software modules and/or computer applications. The web browser 924 is representative of software that is used to provide web browsing functionality, including an interface with a device configured to capture gestures, such as a touch screen, track pad, camera, and so on.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

CONCLUSION

Various embodiments for process relationship management are described. In at least some embodiments, a user interface is presented that provides an integrated view of processes that are running on a computing device and relationships between the processes. For example, the user interface can display a visual indication that a first process is related to a second process and that if a user closes the first process, the second process will also close as a result. Further to one or more embodiments, the user interface can display status messages regarding processes, such as that a process is not responding to a request to close or that a process is waiting on user input.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
presenting in a user interface an indicia that a first process is not responding to a request to close the first process;
displaying in the user interface a visual indication that a second process is dependent on the first process; and
displaying in the user interface a separate visual indication that the second process will close in response to the first process being closed.

2. The computer-implemented method of claim 1, further comprising prior to said presenting, receiving the request to close the first process via input to the user interface.

3. The computer-implemented method of claim 1, wherein the first process comprises a first window associated with an application and the second process comprises a second window associated with the application.

4. The computer-implemented method of claim 3, wherein said visual indication comprises an indication of a hierarchical relationship between the application, the first process, and the second process.

5. The computer-implemented method of claim 1, wherein said displaying the visual indication that the second process is dependent on the first process comprises automatically visually linking, via the visual indication, the first process and the second process in response to an indication that the first process is not responding to the request to close the first process.

6. The computer-implemented method of claim 1, further comprising:
receiving via the user interface an indication to close the first process and the second process; and
closing the first process and the second process.

7. The computer-implemented method of claim 6, wherein closing the first process and the second process comprises force closing at least one of the first process or the second process.

8. A computer-implemented method comprising:
ascertaining, in response to a request to close a first process received via input to a user interface, that the first process is waiting for user input;
presenting, in the user interface, an indication that the first process is waiting for the user input;
displaying, in the user interface, a visual indication that a second process is dependent on the first process; and
displaying, in the user interface, a separate visual indication that the second process will close if the first process is closed.

9. The computer-implemented method of claim 8, further comprising presenting a selectable control that is selectable to shift focus from the user interface to the first process to enable a user to provide the user input.

10. The computer-implemented method of claim 9, further comprising:
receiving the user input to the first process; and
unlinking the first process from the second process to enable the first process and the second process to be closed individually.

11. The computer-implemented method of claim 8, further comprising:
responsive to receiving user input requesting that the first process be closed, closing both the first process and the second process.

12. A system comprising:
one or more processors; and
at least one memory storing computer readable instructions that are executable by the one or more processors to cause the system to implement a graphical user interface comprising:
a visual grouping of processes that are active on a computing device, the processes including a parent process and a child process and the visual grouping indicating a hierarchical relationship between the parent process and the child process with a separate visual indication that if the parent process is closed, the child process will close as a result; and
a selectable control that is selectable to close the processes identified in the visual grouping.

13. The system of claim 12, wherein the parent process comprises an application and the child process comprises a window associated with the application.

14. The system of claim 12, wherein the parent process comprises a web browser, the child process comprises a browser window of the web browser, and the visual grouping of processes includes at least one other child process that corresponds to an additional browser window of the web browser.

15. The system of claim 12, wherein the computer readable instructions are further executable to perform operations including:
receiving an indication that the child process is not responding to a request to close received via a selection of the selectable control;
visually emphasizing in the graphical user interface the visual grouping of processes to indicate that the processes will close in response to a further request to close; and
presenting an indicia in the graphical user interface that the child process is not responding.

16. The system of claim 15, wherein the operations further include causing the process to be force closed in response to a further selection of the selectable control.

17. The system of claim 12, wherein the computer readable instructions are further executable to perform operations including:
receiving a request to close one of the processes in response to a selection of the selectable control;
ascertaining that the one of the processes is waiting for user input; and
presenting an indicia in the graphical user interface indicating that the one of the processes is waiting for user input.

18. The system of claim 17, wherein the graphical user interface further comprises an additional selectable control that is selectable to switch focus to the one of the process to enable the user to provide input to the one of the processes.

19. The system of claim 17, wherein the operations further including visually emphasizing in the graphical user interface the visual grouping of processes to indicate that the processes will close in response to a further request to close.

20. The system of claim 17, wherein the operations further include:
determining that the user input is provided to the one of the processes; and
enabling the one of the processes to be closed separately from others of the processes.

* * * * *